United States Patent
Zhai et al.

(10) Patent No.: US 9,253,847 B2
(45) Date of Patent: Feb. 2, 2016

(54) ADAPTIVE CONTROLLED OUTDOOR LIGHTING SYSTEM AND METHOD OF OPERATION THEREOF

(75) Inventors: Hongqiang Zhai, Jersey City, NJ (US); Jianfeng Wang, Ossining, NY (US); Dave Alberto Tavares Cavalcanti, Mahopac, NY (US); Kiran Srinivas Challapali, New City, NY (US); Tommaso Gritti, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/123,415

(22) PCT Filed: Jun. 11, 2012

(86) PCT No.: PCT/IB2012/052934
§ 371 (c)(1),
(2), (4) Date: Dec. 2, 2013

(87) PCT Pub. No.: WO2012/172470
PCT Pub. Date: Dec. 20, 2012

(65) Prior Publication Data
US 2014/0117852 A1  May 1, 2014

Related U.S. Application Data

(60) Provisional application No. 61/496,119, filed on Jun. 13, 2011.

(51) Int. Cl.
*H05B 37/02* (2006.01)
*H05B 33/08* (2006.01)

(52) U.S. Cl.
CPC ........ *H05B 33/0854* (2013.01); *H05B 33/0872* (2013.01); *H05B 37/0245* (2013.01); *Y02B 20/72* (2013.01)

(58) Field of Classification Search
CPC .............................. H05B 37/00; H05B 37/02
USPC ........ 315/297, 307, 312; 340/825.36, 825.69, 340/825.72, 910, 917
See application file for complete search history.

(56) References Cited

U.S. PATENT DOCUMENTS

| 4,636,931 A | 1/1987 | Takahashi |
| 5,898,384 A * | 4/1999 | Alt et al. ...................... 340/8.1 |

(Continued)

FOREIGN PATENT DOCUMENTS

| CN | 101702853 A | 5/2010 |
| CN | 101784148 A | 7/2010 |

(Continued)

OTHER PUBLICATIONS

Sharma, Anuj et al "Detection of Inclement Weather Conditions at a Signalized Intersection using a Video Image Processing Algorithm", Civil Engineering Faculty Publications, 2006.

*Primary Examiner* — Tung X Le

(57) ABSTRACT

A lighting system (100) including at least one controller (102) and a memory (104) containing program portions which configure the controller (102) to obtain weather forecast information including one or more of current and expected weather conditions over a period of time; determine one or more lighting settings based upon the weather forecast information; form lighting setting information in accordance with the determined lighting settings; and transmit the lighting setting information. The system (100) may include an illumination source (106) to provide illumination in accordance with the lighting setting information The system may change characteristics (e.g., illumination pattern, illumination intensity, illumination spectrum, illumination polarization,) of the illuminated source (106). The process may form lighting setting information to control one or more filters (130) in accordance with a desired lighting setting.

22 Claims, 5 Drawing Sheets

(56) References Cited

U.S. PATENT DOCUMENTS

| | | | |
|---|---|---|---|
| 6,098,893 | A | 8/2000 | Berglund |
| 6,573,659 | B2 | 6/2003 | Toma |
| 6,791,284 | B1 | 9/2004 | Levy |
| 7,761,260 | B2 | 7/2010 | Walters |
| 7,783,183 | B2 | 8/2010 | Garg |
| 8,610,377 | B2 * | 12/2013 | Chemel ............... H05B 7/029 315/297 |
| 2002/0067289 | A1 | 6/2002 | Smith |
| 2002/0067389 | A1 | 6/2002 | Braun |
| 2007/0085701 | A1 | 4/2007 | Walters |
| 2008/0191897 | A1 | 8/2008 | McCollough |
| 2009/0315485 | A1 * | 12/2009 | Verfuerth et al. ............ 315/320 |
| 2009/0316392 | A1 | 12/2009 | Chou |
| 2010/0231140 | A1 | 9/2010 | Aarts |
| 2012/0038490 | A1 * | 2/2012 | Verfuerth ................. 340/910 |
| 2012/0062123 | A1 * | 3/2012 | Jarrell et al. ............... 315/131 |
| 2014/0285095 | A1 * | 9/2014 | Chemel et al. .............. 315/152 |

FOREIGN PATENT DOCUMENTS

| | | |
|---|---|---|
| DE | 4431750 A1 | 3/1996 |
| EP | 2262350 A1 | 12/2010 |
| JP | 6111948 A | 4/1994 |
| KR | 20090108982 A | 10/2009 |
| SU | 624064 A | 9/1978 |
| WO | 9620369 A1 | 7/1996 |
| WO | 9833007 A1 | 7/1998 |
| WO | 2007099574 A2 | 9/2007 |

* cited by examiner

ADAPTIVE CONTROLLED OUTDOOR LIGHTING SYSTEM AND METHOD OF OPERATION THEREOF

The present system relates to an adaptive lighting system and, more particularly, to an adaptive outdoor lighting system that may include weather management and a method of operation thereof.

Given the current revolution in the field of sensory based lighting, there has been a progression from isolated luminaires to individually controllable luminaires. Further, as luminaires have begun to incorporate discrete lighting sources such as light emitting diodes (LEDs) and the like, it is now possible to control the discrete lighting sources. Further, with the advent of network systems such as the Internet, it is now possible to obtain various weather related information such as weather reports and the like, which may provide, past, current, as well as future weather conditions.

According to embodiments of the present system there is disclosed a lighting system including at least one controller (e.g., a processor) which may obtain weather forecast information including one or more of current and expected weather conditions (e.g., a weather forecast); determine one or more lighting settings based upon the weather forecast information; form lighting setting information in accordance with the determined lighting settings; and/or transmit the lighting setting information to one or more luminaires of the system. The luminaires may include a transmitter/receiver (Tx/Rx) which may receive the lighting setting information; at least one illumination source to provide illumination; and/or a control portion to control the illumination source to provide illumination in accordance with the lighting setting information. Further, the controller may determine one or more power settings based upon the weather forecast information and/or form corresponding power setting information. Moreover, the system may further include a power portion having circuitry configured to selectively couple the luminaires to a power source of a plurality of power sources in accordance with the power setting information. Moreover, the controller may select a power source of a plurality of power sources in accordance with weather forecast information. Further, the controller may form the weather forecast information in accordance with one or more of sensor information and weather information, wherein the weather information is obtained from a weather information source. Further, the lighting setting information may include information related to one or more of illumination pattern, illumination intensity, illumination spectrum, illumination polarization, and energy usage of one or more luminaires of the system.

According to embodiments of the present system, there is disclosed a computerized method for controlling a lighting system using a controller, the method may include one or more acts of: obtaining weather forecast information comprising one or more of current and expected weather conditions; determining one or more lighting settings based upon the weather forecast information; forming lighting setting information in accordance with the determined lighting settings; and transmitting the lighting setting information. Moreover, the method may include acts of: receiving the lighting setting information; and/or controlling an illumination source to provide illumination in accordance with the lighting setting information. Further, the method may include acts of determining one or more power settings based upon the weather forecast information; and/or forming corresponding power setting information. Moreover, the method may include an act of coupling luminaires to a selected power source of a plurality of power sources in accordance with the power setting information. Further, the method may include an act of selecting a power source of a plurality of power sources in accordance with weather forecast information. The method may also include an act of determining the weather forecast information in accordance with one or more of sensor information and weather information, wherein the weather information is obtained from a weather information source. The method may also include an act of forming the lighting setting information to include information related to one or more of illumination pattern, illumination intensity, illumination spectrum, illumination polarization, and energy usage of luminaires of the system.

In accordance with embodiments of the present system, there is disclosed a computer program stored on a computer readable memory medium, the computer program configured to provide a user interface (UI) to accomplish a task, the computer program may include a program portion configured to: obtain weather forecast information comprising one or more of current and expected weather conditions; determine one or more lighting settings based upon the weather forecast information; form lighting setting information in accordance with the determined lighting settings; and/or transmit the lighting setting information to one or more luminaires of the system. The program portion may further be configured to receive the lighting setting information; and/or control an illumination source to provide illumination in accordance with the lighting setting information. Further, the program portion may be further configured to: determine one or more power settings based upon the weather forecast information; and/or form corresponding power setting information. Moreover, the program portion may be further configured to select luminaires and couple the selected luminaires to a selected power source of a plurality of power sources in accordance with the power setting information. Further, the program portion may be further configured to select a power source of a plurality of power sources in accordance with weather forecast information. Moreover, it is envisioned that the program portion may be further configured to determine the weather forecast information in accordance with one or more of sensor information and weather information, wherein the weather information may be obtained from a weather resource.

The present system is explained in further detail, and by way of example, with reference to the accompanying drawings wherein.

Figure 1:
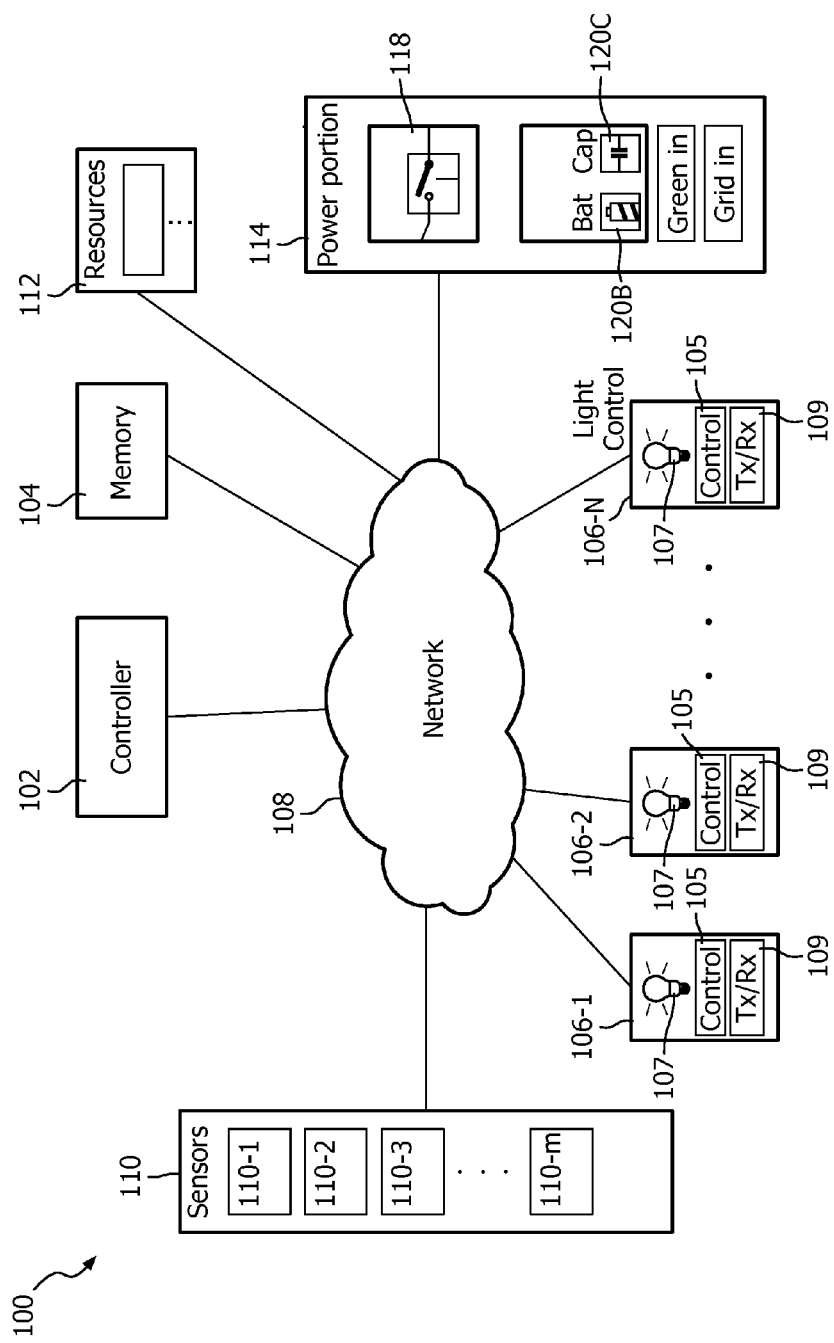
FIG. 1 is a schematic view of a lighting system in accordance with embodiments of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements.

Embodiments of the present system may interface with conventional lighting infrastructures such as urban walkway, street, and/or highway lighting systems to control one or more portions of conventional lighting systems. Further, embodiments of the present system may incorporate automatic weather detection techniques to determine one or more lighting settings and/or to control and/or configure lighting systems in accordance with the determined one or more lighting settings. Embodiments of the present system may obtain weather related information such as past and/or current weather conditions and/or forecasts (e.g., expected future weather conditions), via any suitable network or networks (e.g., the Internet, a telephony network, a wide area network (WAN), a local area network (LAN), a proprietary network, a wireless fidelity (WiFi™) network, a Bluetooth™ network, a peer-to-peer (P2P) network, etc.) and determine one or more lighting settings or system power configurations in accordance with the past, current, and/or future weather conditions. Further, the one or more determined lighting settings or weather related information may be based at least in part upon sensor information obtained from sensors of the system such as optical sensors (e.g., image capture devices such as cameras, etc.), radar-based (e.g., Doppler effect) sensors, rain sensors (resistance based, etc.), location sensors (e.g., GPS, predetermined, etc.), temperature sensors (e.g., thermocouples, infrared (IR), bimetallic, mercury, etc.), etc., which may be located in one or more locations such as poles, luminaires, etc., in accordance with embodiments of the present system. For example, one or more sensors may be incorporated into outdoor light poles and may provide sensor information to the system using any suitable communication method. Although only a limited number of sensors are shown for example in FIG. 1, other sensors are also envisioned such as satellite image sensors which may provide images of atmospheric temperature, cloud cover, precipitation, etc.

In accordance with embodiments of the present system, the sensors may provide sensor information which may be processed to determine weather forecast information, power availability, lighting settings, power settings, etc. For example, Doppler Effect radar sensors may provide information on an amount of precipitation that is currently falling. Further, optical sensors may capture image information which may be processed using a suitable image processing technique to determine, for example, current weather conditions such as whether rain, hail, or snow is falling and/or if clouds are present. The image information may be further processed to determine conditions in the vicinity of the sensor such as ground conditions (e.g., snow on ground, ground wet, ground clear, foreign objects (e.g., rocks) on ground, fallen trees, etc.), as well as current illumination conditions (e.g., sunny, dark, sufficient lighting, insufficient lighting, etc.) in the vicinity of a corresponding sensor.

In accordance with embodiments of the present system, numerous sensing modalities (e.g., sensor types) may be provided to provide sensing information. The sensors may be utilized to provide sensing information for example to determine weather forecast information and/or may also be utilized to adjust/correct sensing information. For example, depending on the sensing modality, particular weather conditions may or may not influence sensing performance of one or more sensors. In accordance with embodiments of the present system, for a case wherein one or more of the system sensors is an image sensor, the one or more sensors may be affected by conditions such as rain, wind, snow, etc. In these embodiments, knowledge about weather conditions such as provided by a sensor and/or other weather information source may help in more robust sensing. For example, in accordance with a weather forecast a specific set of image acquisition parameters and/or detection algorithm settings may be provided to one or more sensors for each weather condition. For example, in the case of strong rain, a detection threshold for an imaging sensor may be increased to avoid false triggers due to, for example, a rain drop moving in front of the sensor. As may be readily appreciated by a person of ordinary skill in the art, a similar type of adaptation may be applied to a given sensing modality and/or weather forecast.

In accordance with embodiments of the present system, a lighting system may be provided which obtains various sensor information such as weather information, image information, etc., which is processed to determine weather conditions and/or lighting conditions in the vicinity of a corresponding sensor at one or more times or periods. Thereafter, an illumination and/or power setting for selected luminaires may be determined in accordance with the determined weather conditions and/or lighting conditions. In accordance with embodiments of the present system there is provided a control system which may set an illumination configuration of a first luminaire in accordance with sensory information received from a second luminaire. Thus, for example, if the sensor information from the second luminaire indicates a dangerous condition (e.g., a hazard on a path such as a foreign object, a vehicular accident, ice, etc.), the system may set an illumination configuration including one or more of an illumination pattern (e.g., a shape of an illuminated area), illumination intensity (e.g., brightness), illumination spectrum (e.g., color), illumination polarization, illumination frequency, etc., of the first luminaire in accordance with the sensor information received from the second luminaire.

FIG. 1 is a schematic view of a lighting system 100 in accordance with embodiments of the present system. The lighting system 100 may include one or more of a controller 102, a memory 104, a plurality of luminaires 106-1 through 106-N (generally 106-x), a plurality of sensors 110-1 through 110-M (generally 110-x), weather resources 112, a power portion 114, and a network 108 which, in accordance with embodiments of the present system, may operably couple two or more of the elements of the present system.

The controller 102 may include one or more processors which may control the overall operation of the system 100. Accordingly, the controller 102 may communicate with one or more of the memory 104, the luminaires 106-x, the sensors 110-x, the power portion 114, and/or the resources 112 to send (e.g., transmit) and/or receive various information in accordance with embodiments of the present system. For example, the controller 102 may request (e.g., using a query or queries, etc.) sensor information from one or more of the sensors 110-x and/or weather forecast information from the resources 112 and may receive corresponding information (e.g., results of the query, etc.) from the sensors 110-x and/or the resources which may be processed to determine lighting settings (e.g., a lighting strategy) for one or more of the luminaires 106-x. Further, the controller 102 may store information (e.g., historical information) which it receives and/or generates, in the memory 104 for further use such as to determine lighting and/or charging characteristics in accordance with embodiments of the present system. As new information is received by the controller 102, the stored information may then be updated by the controller 102. The controller

102 may include a plurality of processors which may be located locally or remotely from each other and may communicate with each other via the network 108.

In accordance with embodiments of the present system, the controller 102 may control the network 108, or portions thereof, to route power from selected sources such as may be available over a "grid" (e.g., a municipal electrical supply system, etc.) and/or from "green" sources (e.g., solar, hydro, chemical, hydrogen, and/or wind power sources) for immediate use and/or storage for use at a later time in accordance with a selected and projected lighting and/or power settings. In this way, embodiments of the present system may plan ahead based the past, present and future forecast weather conditions and plan power distribution and generation configurations and characteristics accordingly. Thus, in a case wherein a windy evening is expected, embodiments of the present system may determine to rely upon wind power generation to power luminaires so as to conserve battery power to extend the life of batteries (e.g., due to decreased cycling and/or optimizing charge rates). Thus, the system may allocate power in accordance with system settings and actual or predicted weather. Accordingly, the system may charge storage devices in accordance with system settings and/or actual or predicted weather. Further, by being able to predict illumination settings due to actual or predicted weather, the system may determine power draw due to luminaires and may prepare energy sources (e.g., batteries, capacitors, fuel cells, chemical cells, thermo cells, etc.) to store power based upon the actual or predicted weather.

For example, the controller 102 may determine expected energy requirements over time (e.g., of one or more of the luminaires 106-x) and compare them with threshold availability requirements of a power source (e.g., a battery, the "grid," a capacitor, etc.) over time and, if it is determined that the projected energy requirements exceed the threshold availability requirements of a power source, the controller 102 may configure the system such that other power sources may supply power. However, it is also envisioned that the controller 102 may select power storage devices in accordance with a weight (e.g., a rank). Thus, for example green sources may be weighted higher than a conventional fossil fuel source (e.g., the "grid," etc.). Further, the controller 102 may determine lighting settings (e.g., illumination pattern, illumination intensity, illumination spectrum, illumination polarization, illumination frequency, etc.) for a corresponding luminaire 106-x and may determine energy requirements in accordance with the determined lighting configurations. Moreover, the controller 102 may request weather reports from the resources 112 and may determine when to charge selected power storage devices in accordance with system settings based on received weather report information and/or history information (e.g., statistical information, etc.). Accordingly, the system may include statistical and/or heuristic engines to fit data.

The network 108 may include one or more networks and may enable communication between one or more of the controller 102, the memory 104, the resources 112, the luminaires 106-x, the sensors 110, and/or the power portion 114, using any suitable transmission scheme such as a wired and/or wireless communication schemes. Accordingly, the network 108 may include one or more networks such as a wide area network (WAN), a local area network (LAN), a telephony network, (e.g., 3G, a 4G, etc., code division multiple access (CDMA), global system for mobile (GSM) network, a plain old telephone service (POTs) network), a peer-to-peer (P2P) network, a wireless fidelity (WiFi™) network, a Bluetooth™ network, a proprietary network, etc. Further, the network 108 may include one or more power supply networks which may provide power to the system 100 via, for example, conventional sources (e.g., the "grid") and/or "green" sources such as solar, hydro, wind, fuel cells, chemical, thermal, battery, etc. Accordingly, the network 108 may include power switching circuitry such as may be included in the power portion 114 to switch power to/from a desired electrical destination/source.

The memory 104 may include any suitable non-transitory memory and may store information used by the system such as information related to operating code, applications, settings, history, user information, account information, weather related information, system configuration information, calculations based thereon, etc. The memory 104 may include one or more memories which may be located locally or remote from each other (e.g., a surface area network (SAN).

The resources 112 may include weather related information resources such as proprietary and/or third party weather related resources (e.g., the National Weather Service, Accuweather™, etc.) which may provide weather information such as weather reports and/or forecasts (generally weather forecast information which may include actual or expected weather forecast information) to the controller 102 and/or the luminaires 106-x. Further, the resources 112 may include weather report applications to process information which may be sent to the resources 112 such as the sensor information and/or weather reports and provide corresponding weather forecast information. Thus, the weather report applications may further refine a weather report for an area and/or time period using sensor information obtained by sensors such as the sensors 110-x.

The power portion 114 may include power sources which may include conventional (e.g., "grid" based (e.g., from a municipal power authority) or "green" (e.g., from a "green" source such as hydro, solar, wind based sources, etc.) and/or combinations thereof. Further, the "green" power may be supplied locally (e.g., from a local battery, a solar cell, etc.) or may be supplied via an electrical supply grid from one or more remote "green" sources. Accordingly, the system 100 may include a plurality of "green" power generation devices such as solar cells and/or wind and/or hydrodynamic generators. Further, the power portion 114 may include active and/or passive components such as networks, switches, etc. (generally power circuitry 118), to transport and/or switch power to, or from, one or more power sources (e.g., the "grid," the battery 120B and/or capacitor storage 120C, etc.) in accordance with energy settings of the system. The energy settings of the system may be determined by the controller 102 based upon, for example, weather information, power supply information (e.g., power blackout expected at 12:00 am, duration 3 hours, etc.), lighting settings (e.g., full, energy savings, etc.), power requirements, etc. Accordingly, the power circuitry 118 may be configured in accordance with the energy settings so as to switch power to and/or from, sources (e.g., the "grid," battery storage, solar cells, capacitors, thermal storage, chemical storage, fuel cells, etc.). Thus, the controller 102 may configure the power portion 114 with a power setting such that a first luminaire 106-1 may operate on power from the "grid," while a second luminaire 106-2 may operate on battery power, while a third luminaire 106-3 may operate on solar power provided by a solar cell (e.g., at a remote location), etc., as desired. Generally, the controller 102 and/or other portions of the system (e.g., one or more of the sensors, the luminaires, and the power portion) may operate as a power management module. In accordance with embodiments of the present system, the power management module may determine the power required by the system at various times and thereby control power usage and/or generation to allocate power to luminaires, storage devices, sources, etc.

For example, the controller 102 may query the power portion 114 for information related to power sources such as available supply (e.g., by day, date, hour, etc.), charge (e.g., 80% of 100 kiloWatt-hours (kWh)), operative state (inactive for service, operative, 50% reliable, etc.), etc. The power storage devices 120 may include power storage elements such as batteries 120B, capacitors 120C, chemical cells, fuel cells, thermal cells, etc., which may store power for later use by the system 100 and which may be located locally and/or remote from each other. For example, one or more storage elements such as batteries, capacitors, etc., may be located in one or more corresponding luminaires 106-x and may be selectively configured to charge and/or provide power to a selected luminaire 106-x which may include the corresponding luminaire 106-x and/or a different luminaire 106-x. The power provided by the power portion 114 may be generated by conventional sources and/or by "green" sources and may be selectively stored, routed, and/or consumed (e.g., by selected luminaires, etc.) in accordance with a selected system configuration.

The sensors 110 may include a plurality of sensors such as sensors 110-1 through 110-M (generally 110-x) which may generate sensor information such as image information, status information (e.g., luminaire operative, non operative, etc.), radar information (e.g., Doppler information, etc.), geophysical information (e.g., geophysical coordinates obtained from, for example, a global positioning system (GPS)), pressure information, humidity information, etc. The sensors 110-x may be located at one or more geophysical locations and may report their location to the controller 102. Each sensor 110-x may include a network address or other address which may be utilized to identify the sensor.

The luminaires 106-x may include one or more of a transmission/reception (Tx/Rx) portion 109, a controller 105 (which may be part of the controller 102), illumination sources 107 such as lamps (e.g., a gas lamp, etc.), light emitting diodes (LEDs), incandescent lamps, fluorescent lamps, etc., and may be controlled by the controller 105. Further, the illumination sources may be configured in a matrix (e.g., a 10×10 matrix of illumination sources) in which illumination characteristics such as illumination pattern, intensity, spectrum (e.g., hue, color, etc.), polarization, frequency, etc., from one or more of the plurality of illumination sources and/or light pattern for a plurality of illumination sources, may be actively controlled by the system. The luminaires 106 may further include one or more light controlling elements 130 such as active reflector arrays to actively control illumination patterns from one or more of illumination sources of the plurality of illumination sources. For example, the one or more active reflector arrays may be electronically positioned and/or otherwise manipulated to provide (e.g., via reflection, refraction, and/or transmittance) illumination from one or more illumination sources into a desired area thus controlling an illumination pattern (e.g., controlling the shape and/or size of the illumination pattern such as is described with reference to 235-8 below). Further, the one or more active reflector arrays may be electronically controlled to control an illumination intensity (e.g., in lumens) of an illumination pattern as will be described below. Moreover, the light controlling elements 130 may include one or more active filters which may be controlled to control illumination transmission therethrough (e.g., via transmittance), illumination spectrum, and/or illumination polarization of illumination passing therethrough. Further, the controller may control illumination spectrum and/or light output (e.g., in Lm/M2) by one or more of the illumination sources. Thus, the controller may control an illumination intensity by controlling the illumination output from an illumination source. Similarly, the controller may control two or more illumination sources to control an illumination pattern.

Thus, illumination characteristics such as illumination pattern, illumination intensity, illumination spectrum, illumination polarization, etc., of one or more luminaires may be controlled by the controller 105 and/or by the respective luminaire 106-x. Each luminaire 106-x and/or groups thereof may include a network address and/or other identifying information such that transmissions from/to the luminaire 106-x may be suitably directed. The luminaire identifying information may further include a geophysical location.

Figure 2:
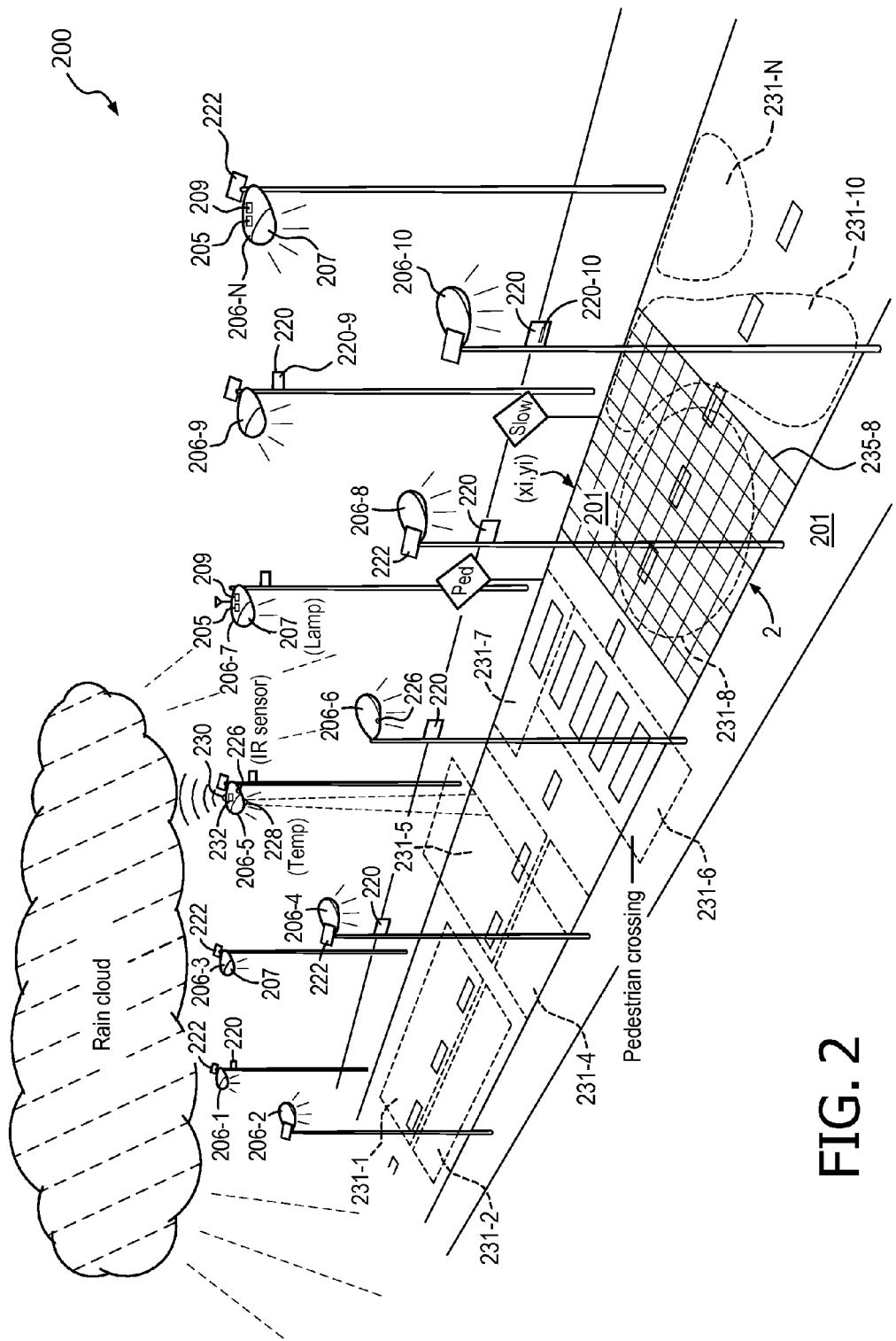
FIG. 2 is perspective view of a lighting system in accordance with embodiments of the present system.

FIG. 2 is perspective view of a lighting system 200 in accordance with embodiments of the present system. The lighting system 200 may be similar to the lighting system 100 and may include a plurality of luminaires 206-1 through 206-N which may illuminate a surface 201 such as a street/sidewalk, etc., with a controllable illumination pattern 231-x. One or more of the luminaires 206-x may include one or more of an illumination source 207, a battery storage 220, a controller 205, a Tx/Rx portion 209, and a solar cell 222. The illumination source 207 may include one or more lamps such as LEDs, gas lamps, fluorescent lamps, incandescent lamps, etc., which may provide illumination under the control of the controller 205. The Tx/Rx portion 209 may transmit and/or receive information such as sensor information, lighting setting information, power setting information, etc., to and/or from the controller (e.g., see, controller 102), other luminaires 206-x, a power portion, sensors, etc. The battery 220 may receive energy generated by a corresponding solar cell 222 and may store the energy selectively for later use by one or more selected luminaires 206-x. Further, one or more of the luminaires 206-x may include sensors such as an infrared (IR) temperature sensor 226, an air (e.g., ambient) temperature sensor 228, a radar sensor 230 (e.g., a Doppler effect radar sensor to detect precipitation), an image sensor 232, etc., which may be included in sensor information provide to a controller in accordance with embodiments of the present system. For example, the IR temperature sensor 226 may report temperature such as ground temperature in one or more locations about a corresponding luminaire 206-x. The air temperature sensor 228 may provide air temperature information in the vicinity of a corresponding luminaire 206-x. Further, the image sensor may provide image information (e.g., which may be processed to determine atmospheric conditions such as whether it is raining, desired illumination levels, etc.).

The controller may process the sensor information and/or weather information (e.g., received from a third party such as Accuweather™, etc.) and determine a lighting setting in accordance with the weather information and/or the sensor information. The controller may then form corresponding lighting setting information that may be transmitted to one or more of the luminaires 206-x. The lighting setting information may include information that may be used to control characteristics of a luminaire such as power use, illumination patterns, illumination intensities, illumination spectrums (e.g., hues, colors, etc.), illumination polarizations, etc., of one or more of the luminaires 206-x. Further, in accordance with embodiments of the present system, it is envisioned that one or more luminaires 206-x may transmit sensor information to a neighboring luminaire 206-x (e.g., using a low power communication link) which may then form corresponding sensor information for two or more luminaires 206-x and transmit (e.g., using a higher power communication link) this sensor information to the controller for further processing.

Moreover, with respect to an illumination pattern 231-8, the controller may control the luminaires 206-x to adjust illumination intensity for one or more determined areas or portions of one or more areas of an illumination pattern (e.g., see, darker shading which indicates brighter illumination than lighter shading in FIG. 2) in accordance with the lighting setting information. Thus, for example, assuming a luminaire 206-x such as the luminaire 206-8 may illuminate an area 235-8 which may correspond with, for example, an illuminated matrix ($x_i$, $y_j$), the controller may control the illumination source 206-8 to adjust an illumination pattern to illuminate an area such as the whole matrix ($x_i$, $y_j$) or a portion of the matrix such as an area defined by an illumination pattern 231-8. Moreover, within an illumination pattern such as the illumination pattern 231-8 the controller may control the luminaire 206-x to control an illumination intensity (e.g., in lumens/area$^2$) such that portions of the pattern 231-8 have more or less illumination as illustrated by the above mentioned lighter and/or darker shading shown within the illumination pattern 231-8. Thus, an illumination pattern and/or an illumination intensity (e.g., within the pattern or within the whole area illuminated by a corresponding luminaire 238-x) may be controlled by the system.

Further, the controller may receive (e.g., in response to requests or periodically) sensor information which may be analyzed (e.g., using image analysis of image information received in the sensor information) and determine whether a lighting pattern is sufficient and/or to adjust a lighting pattern if it is determined that a current lighting pattern does not meet current lighting requirements (e.g., is insufficient).

The controller may then form and/or update a lighting setting information database in a memory of the system 200 in accordance with information generated and/or received by the system such as the current lighting setting information, sensor information, weather information, and/or weather forecasts, etc. for later use. Thus, lighting settings for certain weather patterns may be modified by the system and/or by a user as described herein.

Figure 3:
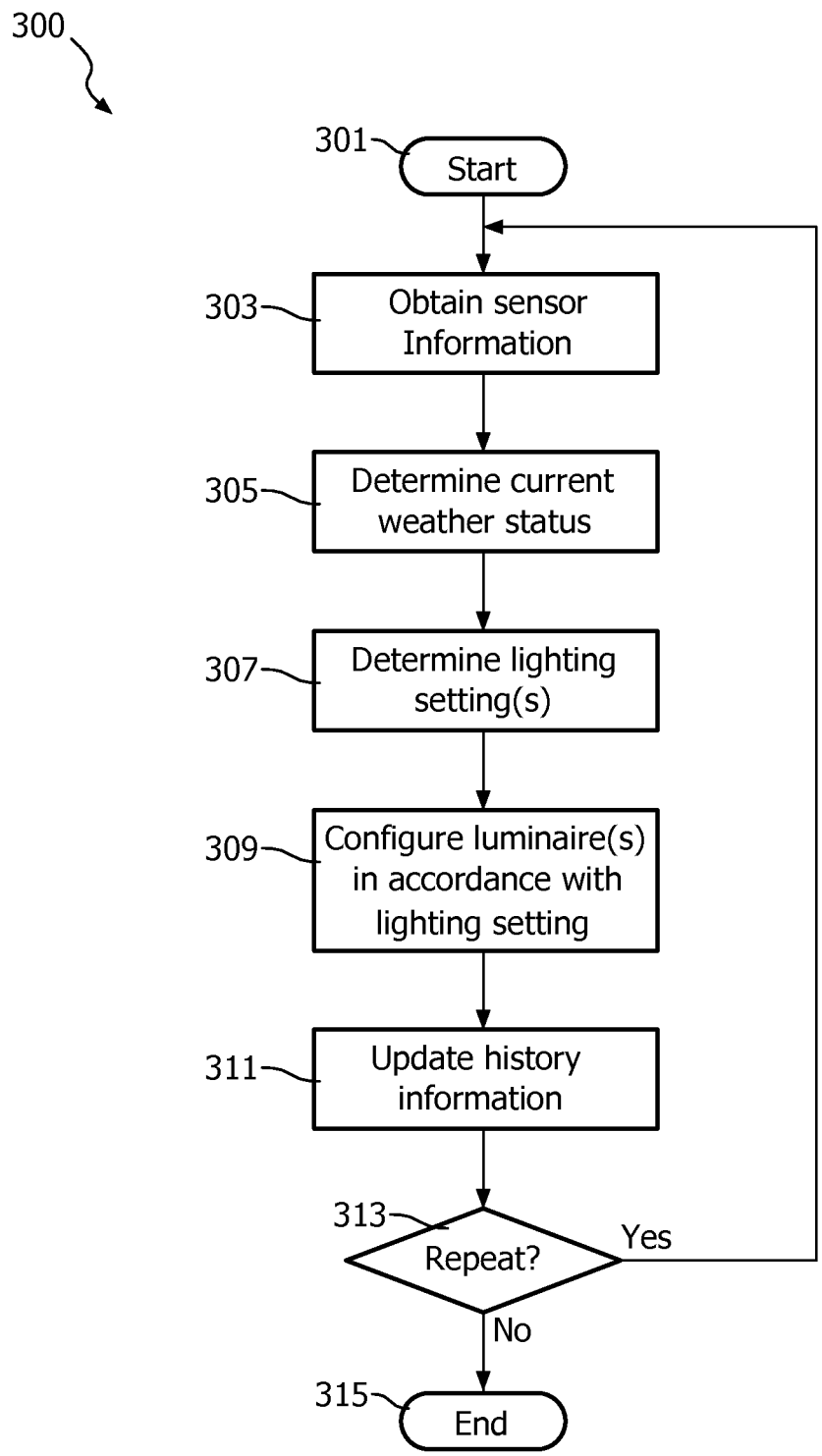
FIG. 3 shows a flow diagram that illustrates a process in accordance with embodiments of the present system.

FIG. 3 shows a flow diagram that illustrates a process 300 in accordance with embodiments of the present system. The process 300 may be performed by a system having one or more computers that may communicate over a network, such as the network 108 shown in FIG. 1. The process 300 may include one or more of the following acts. Further, one or more of these acts may be combined and/or separated into sub-acts, if desired. In operation, the process may start during act 301 and then proceed to act 303.

During act 303, the process may obtain sensor information which may include information indicative of weather conditions in the vicinity of one or more luminaires capable of providing illumination in accordance with embodiments of the present system. Accordingly, the process may obtain sensor information which may, for example, include one or more of image information, temperature information (e.g., ground and/or air), Doppler radar information, pressure information, wind speed and/or direction information, barometric pressure information, relative humidity information, etc. After obtaining the sensor information, the process may continue to act 305.

During act 305, the process may determine current weather status by analyzing the sensor information. For example, the process may analyze image information, temperature information, pressure information, radar information, and determine that it is currently raining. Further, the current weather status information may include information related to the current weather conditions in the vicinity of reporting sensors such as one or more of precipitation (e.g., rain, snow, fog, drizzle, ice, etc.), a rate of precipitation (e.g., 0.02, 2, etc., inches of rain per hour obtained by radar, collector, and/or image based sensors), humidity (bar), barometric pressure (inches-mercury in-hg), dew point, ambient illumination (e.g., dark such as nighttime which may also be determined together with or indecently with time information on a current time), etc. For example, the process may process image information using an image recognition algorithm or other digital signal processing technique and determine that it is raining and dark and form corresponding current weather status information. The process may also determine ground and/or air temperatures, etc. To determine the current weather status information, the process may use any suitable method such as a weather forecast application which may be run locally or at a remote location (e.g., by a third party application, etc.), etc. Accordingly, the process may forward the processed or unprocessed sensor information to a weather forecast application and receive information related to the current weather status (e.g., rain, dew point, expected weather pattern (e.g., clearing, becoming cloudier, colder, etc.) etc.). Accordingly, the current weather status information may further include future weather forecast information. Further, it is envisioned that the process may obtain the weather status information from a third party application. After completing act 305, the process may continue to act 307.

During act 307, the present system may determine a lighting setting in accordance with the current weather status information. The lighting setting may, for example, control the profile, illumination pattern(s), intensities, spectrum(s), polarization(s), frequencies (e.g., for flashing or continuous lighting, etc.), etc., of illumination provided by one or more of the one or more luminaires. Accordingly, the lighting setting may be determined using an algorithm and/or a look up table such as is shown in Table 1 below.

TABLE 1

| Weather Status | Lighting Setting | | | | |
|---|---|---|---|---|---|
| | Pattern (Profile) | Intensity (all areas) | Color (Spectrum) | Frequency | Power Usage (estimated) |
| Clear | Normal | Normal | White | 90 Hz | 5 kw/h |
| Overcast | Normal | Normal | White | 90 Hz | 5 kw/h |
| Fog | Spread | Normal | Yellow | 90 Hz | 6 kw/h |
| Rain | Spread | High | Yellow | 90 Hz | 8 kw/h |
| Snow | Spread | Low | Yellow | 90 Hz | 5 kw/h |
| Ice | Spread | High | Red | 20 Hz Flashing | 8 kw/h |

In Table 1, the illumination pattern may include a normal and a spread pattern. The normal profile may define a normal area (e.g., a matrix) having a normal shape and/or size while a spread profile may have, for example, the same shape but may have a bigger size (or may have a different shape, if desired).

Accordingly, the present system may set the lighting setting based upon the weather status information. For example, if the identified weather status is determined to be Fog (e.g., foggy), the process may set the light profile to spread the intensity to normal, the color to yellow and the frequency to 90 Hz (e.g., not flashing). The lighting settings as shown Table 1 may be set and/or updated by the system and/or by the user. For example, with respect to the Fog weather status setting, the user may set the color frequency to Red and may set the frequency to 20 Hz such that a flashing red light will be perceived by an individual when noticing light output from a corresponding luminaire. However, it is also envisioned that the system may use historical information to modify information in a lighting setting table. After determining the lighting setting, the process may form corresponding lighting setting information which may be transmitted to, and/or received by, a central controller and/or one or more of the selected luminaires of a plurality of luminaires in the lighting system, if desired. After completing act 307, the process may continue to act 309.

During act 309, the present system may configure the selected luminaires to illuminate in accordance with the lighting setting information. For example, LED sources may be configured to output illumination patterns, intensities, colors, color intensities, color spectrums, and/or frequencies in accordance with the lighting setting information. The illumination patterns may be determined using matrixes which may indicate intensity distribution over area. Moreover, different illumination sources (e.g., gas lamps, LEDs, etc.) may be selected based upon the illumination settings. After completing act 309, the process may continue to act 311.

During act 311, the present system may form and/or update history information (e.g., a statistical information) of a memory of the present system in accordance with the determined weather status, the sensor information, day, date, time, etc. which information may be used at a later time. After completing act 311, the process may continue to act 313.

During act 313, the present system may determine whether to repeat one or more acts of the process. Accordingly, if it is determined to repeat one or more acts of the process, the process may continue to act 303 (or to another act which is desired to be repeated). Conversely, if it is determined not to repeat one or more acts of the process, the process may continue to act 315, where it ends. The process may be repeated at certain periodic and/or non-periodic time intervals. By repeating the process, history information may be accessed and used to determine, for example, rate of change of the sensor information. For example, when repeating act 305, past weather or sensor information may be obtained and compared with current weather or sensor information to determine a rate of change of rainfall, temperature, humidity, barometric pressure, cloud cover, etc. This information may be used to determine lighting settings. For example, if the rate of change of rainfall is greater than 2 inches per hour, the process may select a corresponding lighting setting such as a maximum intensity red illumination to indicate increasing rainfall; while if it is determine that the rainfall is decreasing, the process may select a lighting setting of minimum intensity, green illumination to indicate passing of the heavy rainfall, etc., to indicate that the rainfall is decreasing. Accordingly, a person located indoors may easily ascertain outdoor weather conditions by observing illumination patterns of luminaires operating in accordance with embodiments of the present system. This may be useful for example, for person in a store who may wish to determine whether to go outside at the present time or remain indoors until, for example, a thunderstorm ends.

Figure 4:
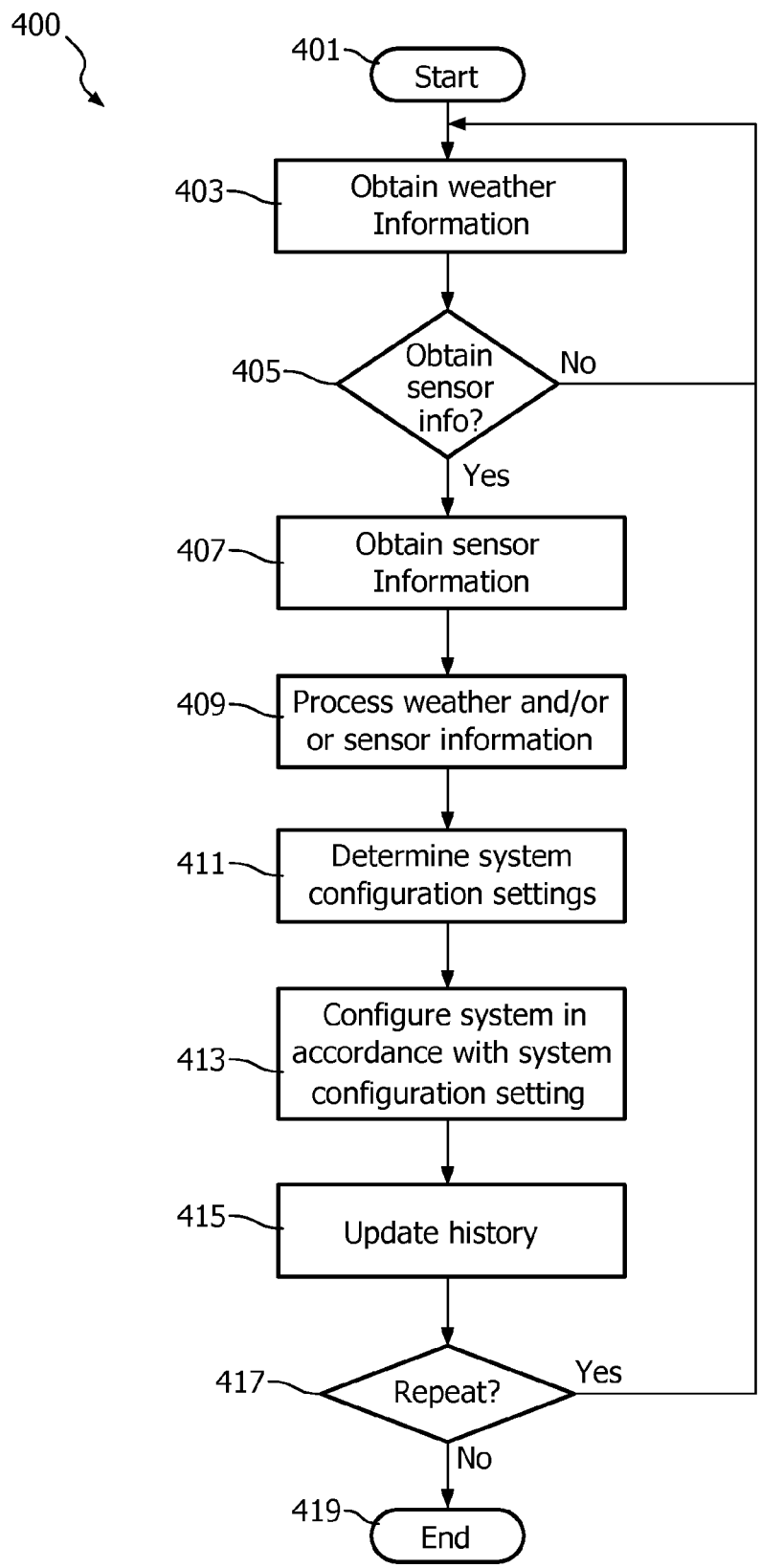
FIG. 4 shows a flow diagram that illustrates a process in accordance with embodiments of the present system.

FIG. 4 shows a flow diagram that illustrates a process 400 in accordance with embodiments of the present system. The process 400 may be performed by a system having one or more computers which may communicate over a network. The process 400 may include one of more of the following acts. Further, one or more of these acts may be combined and/or separated into sub-acts, if desired. In operation, the process may start during act 401 and then proceed to act 403.

During act 403, the present system may obtain weather information from one or more sources such as third party sources (e.g., Accuweather™, etc.). The weather information may include weather forecast information indicative of, for example, current and/or future (e.g., expected) weather patterns (e.g., rain expected between the hours of 3 and 8 pm today, etc.). The weather information may be received in response to a query request from the controller and/or may be pushed to the controller (e.g., at predetermined times, periodically, etc.). In accordance with embodiments of the present system, a query request may be generated periodically, non-periodically, at specified times, due to a certain occurrence (e.g., detected change in weather, such as was raining, as determined from historical weather information, but currently is not), when sensor information is received from luminaires, etc., which may be determined by the process and/or user. To converse resources, the query may be specific to an area served by the lighting system. Accordingly, weather information relevant to a specific area in which, for example, the system is located in and/or peripheral areas (e.g., a 50 mile radius) may be returned to the system as results of the query. After completing act 403, the process may continue to act 405.

During act 405, the present system may determine whether to obtain sensor information from one or more sensors of the present system. The system may select certain sensors from which information is desired based upon location and/or type of sensor or other information. For example, if the process determines to check for solar conditions (e.g., sunlight) to charge batteries, the system may query image sensors for information. For example, if the process determines to check for a rate of precipitation, it may query Doppler radar sensors for information. The process may determine to obtain sensor information at certain times (e.g., when it is dark, at noon, etc.), at predetermined periodic or non periodic intervals, when configuring the system (e.g., when configuring "green" power sources for charging, discharging, etc.), and/or when certain weather status such as inclement weather (e.g., fog, rain, sleet, ice, snow, etc.) is predicted during act 403. Accordingly, if it is determined to obtain sensor information, the process may continue to act 407. Conversely, if it is determined not to obtain sensor information, the process may continue to act 409. Further, during act 405, the process may select sensors from which information is desired (e.g., image sensors, radar sensors, etc.).

During act 407, the present system may obtain sensor information from one or more selected sensors of the present system. Accordingly, the process may query the selected sensors for the desired information and receive the results of the query which may include sensor information. However, it is also envisioned that the sensor information may be generated at certain times (e.g., hourly, etc.), when certain events occur (e.g., it is determined that it has begun to rain, etc.). After completing act 407, the process may continue to act 409.

During act 409, the present system may determine a current weather forecast (e.g., including weather status and/or a weather forecast information) for a certain time interval (e.g., 1, 12, 24 hrs., etc.). Accordingly the present system may analyze one or more of the weather information and the sensor information using any suitable method. For example, text based weather information may be analyzed using a context-based analysis engine while image based weather information and/or the sensor information may be analyzed using, for example, a digital signal processing (DSP) method, an image processing method, etc., to determine a current and/or expected weather status for one or more times or time periods (e.g., 24 hours in the present example). This information may be indexed for further use in determining system power configuration as will be described below with reference to Table 2. For example, in the present example, it will be assumed that the image based weather information such as Doppler radar map image information may be processed and it may be determined that it is currently raining. Further, the weather information may be processed and it may be determined that rain is expected to last for several hours before clearing at about 9:00 pm. Accordingly, the present system may determine that a current weather status until 9:00 pm output of one or more solar cells during similar weather conditions or weather forecasts (e.g., a clear day, an overcast day, etc.), on or about the same date (e.g., to account for ecliptic or other variations), and/or at about the same temperature (e.g., to account for temperature variations), and obtain results of the query which may be used to interpolate expected power gain from the one or more solar cells. Further, with respect to other "green" power sources, such as wind turbines, the embodiments of the present system may determine for example, expected wind speed for a given period to determine expected output of from one or more wind turbines based upon specified information (e.g., a manufacture's data sheet or past performance which may be, for example, stored in the history information or obtained via a network when desired by the process).

TABLE 2

| Weather | Time (hrs.) Currently 18:30 hrs Jun. 13, 2020-Jun. 14, 2020 | | | | | | | |
|---|---|---|---|---|---|---|---|---|
| Status | 18:00-21:00 | 21:00-24:00 | 00:00-03:00 | 03:00-06:00 | 06:00-09:00 | 09:00-12:00 | 12:00-15:00 | 15:00-18:00 |
| Clear | | | x −5 kw/h | x −5 kw/h | x −5 kw/h | x +10 kw/h | x +15 kw/h | x +15 kw/h |
| Overcast | | x −5 kw/h | | | | | | |
| Fog | | | | | | | | |
| Rain | x c −8 kw/h | | | | | | | |
| Ice | | | | | | | | |
| Snow | | | | | | | | | corresponds with a rain setting and that it will be clearing after 9:00 pm. The present system may index the forecast weather information using any suitable method such as shown in Table 2 below which is a graph illustrating (current, and future) weather status information over time and expected energy draw (illustrated as "−") or gain (illustrated as "+") in units such as kWh. The energy draw may correspond with energy consumed by the system and the gain may be energy provided to the system from one or more sources such as "green" sources. However, it is also envisioned that the energy gain may reflect power provided by the "grid." Further, the present system may determine that after 9:00 pm the weather will be clear until the next evening. Accordingly, the embodiments of the present system may determine energy provided by, for example, solar cells (e.g., during daylight hours), using predetermined calculations and/or using history information. The history information may provide data, such as statistical data, which may be used to calculate power produced by a particular source such as a "green" source. For example, with respect to solar cells, the embodiments of the present system may determine expected power gain from one or more solar cells in accordance with history information corresponding with power generated by the one or more solar cells. Accordingly, the present system may query a memory for historical With respect to Table 2, an "x" indicates a predicted weather pattern (c.f., Tables 1 and 2) and the "c" indicates a current time interval. After completing act 409, the process may continue to act 411.

During act 411, the present system may determine appropriate system configuration settings for the determined weather forecast. The system configuration settings may include system power configuration settings and/or lighting settings for the determined weather forecast. Accordingly, the lighting settings may be selected using any suitable method such as a table lookup as illustrated in Table 1 above. Further, to determine system power settings, the system may rely upon any suitable power distribution analysis and/or techniques. For example, by determining expected lighting settings and weather status for a period of time (e.g., 6, 12, 24, 36, 48 . . . hrs.), the system may determine expected power use for the period (e.g., shown in kWh although other units of measurement are also envisioned). Accordingly, embodiments of the present system may map expected power use (e.g., due to usage) and/or power availability (e.g., due to "green" sources, the "grid," etc.) and determine suitable system power settings. For example, Table 3 illustrates a graph of expected power availability by date/time for the system in accordance with embodiments of the present system.

TABLE 3

| | | Power Availability (kw/h) By Time (hrs) Currently 18:30 hrs Jun. 13, 2020 | | | | | | | | | | | | | | |
|---|---|---|---|---|---|---|---|---|---|---|---|---|---|---|---|---|
| Source Type | Source ID | 18:00-21:00 | | 21:00-24:00 | | 00:00-03:00 | | 03:00-06:00 | | 06:00-09:00 | | 09:00-12:00 | | 12:00-15:00 | | 15:00-18:00 |
| Ilum. | Lighting | −8 | | −5 | | −5 | | −5 | | −5 | | 0 | | 0 | | 0 |
| Storage | Battery (avail)/(charge) | 30 | −8 | 22 | −5 | 17 | −5 | 12 | −5 | 7 | −5 | 2 | 10 | 12 | 15 | 27 | 3 |
| | Capacitors (avail)/(charge) | 0 | 3 | 3 | 3 | 6 | 1 | 7 | 1 | 8 | 1 | 9 | 1 | 10 | 1 | 11 | 15 |

TABLE 3-continued

Power Availability (kw/h) By Time (hrs) Currently 18:30 hrs Jun. 13, 2020

| Source Type | Source ID | 18:00-21:00 | 21:00-24:00 | 00:00-03:00 | 03:00-06:00 | 06:00-09:00 | 09:00-12:00 | 12:00-15:00 | 15:00-18:00 |
|---|---|---|---|---|---|---|---|---|---|
| "Green" sources | Wind | 3 | 3 | 1 | 1 | 1 | 1 | 1 | 2 |
| | Solar | 0 | 0 | 0 | 0 | 0 | 10 kw/h | 15 kw/h | 15 kw/h |
| "Grid" Supply | Grid | 10 | 0 | 10 | 10 | 10 | 10 | 10 | 10 |

With reference to Table 3, the process may determine the power required by the system at various times for a given time such as, for example, a 24 hour period. However, other periods such as 12, 36, 72,etc., are also envisioned. Accordingly, the present system may control power usage and/or generation to allocate power to luminaires (e.g., including illumination sources), storage devices (e.g., batteries, capacitors, etc.), sources (e.g., the "grid," solar, wind, batteries, fuel cells, etc.), etc., in accordance with a look-ahead technique based upon forecast weather. Further, the present system may include an energy savings mode in which illumination output may be reduced by a predetermined amount that may vary in accordance with available power, weather forecasts, etc. For example, during a warm, calm, and dry evening (e.g., warm, clear and low wind speed conditions), the present system may control the luminaires to reduce power output by a 10%, and thereby the present system may reallocate available and/or generated energy in accordance with the reduced energy demands. With reference to the storage devices, available power (e.g., at the start of a time period) is shown in the box on the left side and charge or discharge (e.g., indicated as negative value) is shown in the box on the right side. Thus, during the time period 18:00 through 21:00 hours for example, the battery storage may have an available expected power availability of 30 kWh and a draw of 8 kWh due to consumption by the lighting system which is shown configured to draw power from the batteries during this time period. Excess power generated by "green" sources may be selectively used to charge storage devices such as the batteries and/or capacitors. For example, wind power generated by the system may be sent to charge the capacitors, while solar power may be sent to charge the batteries. After either the batteries or the capacitors are charged, extra power from green sources may be transmitted directly to other devices and/or back to the "grid" for power generation credit.

Moreover, in accordance with embodiments of the present system, a system configuration may be selected to maximize the amount of "green" power available to be transmitted to the "grid" for credit. Thus, the present system may determine expected power draw and/or availability in accordance with a weather forecast for a period of time and allocate power accordingly. For example, a projected amount of power generation by wind power sources may be determined by the process using weather forecast information such as wind speed and/or direction for a given period which may be related to expected power generation by the wind power sources over a corresponding time. Similarly, hydro power may be determined by the process using forecast weather information which may include information related to expected precipitation, melting, and/or tides which may affect hydro power generation. Likewise, weather forecasts may be used by the process to determine an expected amount of sunlight which may be available (e.g., by time of year, time of day, actual and expected cloud cover, etc.) to generate solar power. Further, the process may rely upon historical data to determine power which may be generated by green sources, etc.

Further, the process may determine whether there will be any projected blackouts of "grid" power (e.g., time, duration, etc.) and determine system configuration settings based on the projected available power and expected usage. Accordingly, the process may query servers (e.g., of an electrical utility company or a municipality) or use a natural language search (e.g., of text, audio, and/or video information such as newscasts) to obtain information of blackouts such as expected time and/or duration. After completing act 411, the process may continue to act 413.

During act 413, the present system may be configured in accordance with the determined system configuration settings. Accordingly, the process may form system configuration settings information and transmit this information using any suitable method such as a wired and/or a wireless transmission system. The system configuration setting information may include information related to commands, settings and/or configuration for luminaires, sensors, and/or power portions of the present system. Accordingly, the process may transmit the system configuration setting information to the luminaires, power portion, and/or sensors of the system, which in response may then be configured to operate in accordance with the received system configuration setting information. For example, a certain luminaire may be configured to draw on battery power and provide a certain amount of illumination (e.g., illumination intensity in lumens/area$^2$) in a certain illumination pattern, etc. Similarly, power circuits may be configured to provide "green" power (e.g., battery power, hydro power, etc.) to one or more luminaires, etc. However, it is also envisioned that the luminaires may include power circuits to switch power between sources such as a "grid" and/or a battery source. After completing act 413, the process may continue to act 415.

During act 415, the present system may form and/or update statistical information of the process such as history information (e.g., which may include a statistical database), which may be stored in a memory of the present system, in accordance with information generated during one or more acts of the process such as the determined weather status, the sensor information, day, date, time, system configuration, settings information, etc., which information may be used at a later time as described herein. After completing act 415, the process may continue to act 417.

During act 417, the present system may determine whether to repeat one or more acts of the process acts. Accordingly, if it is determined to repeat the process, the process may continue to act 403. Conversely, if it is determined not to repeat the process, the process may continue to act 415, where it ends. In accordance with embodiments of the present system, the process may determine to repeat when, for example, a certain events occur such as a period of time has elapsed, lighting is determined to be insufficient, a source or luminaire has failed, an emergency occurs, actual, expected and/or projected requirements change, power availability changes, etc.

Figure 5:
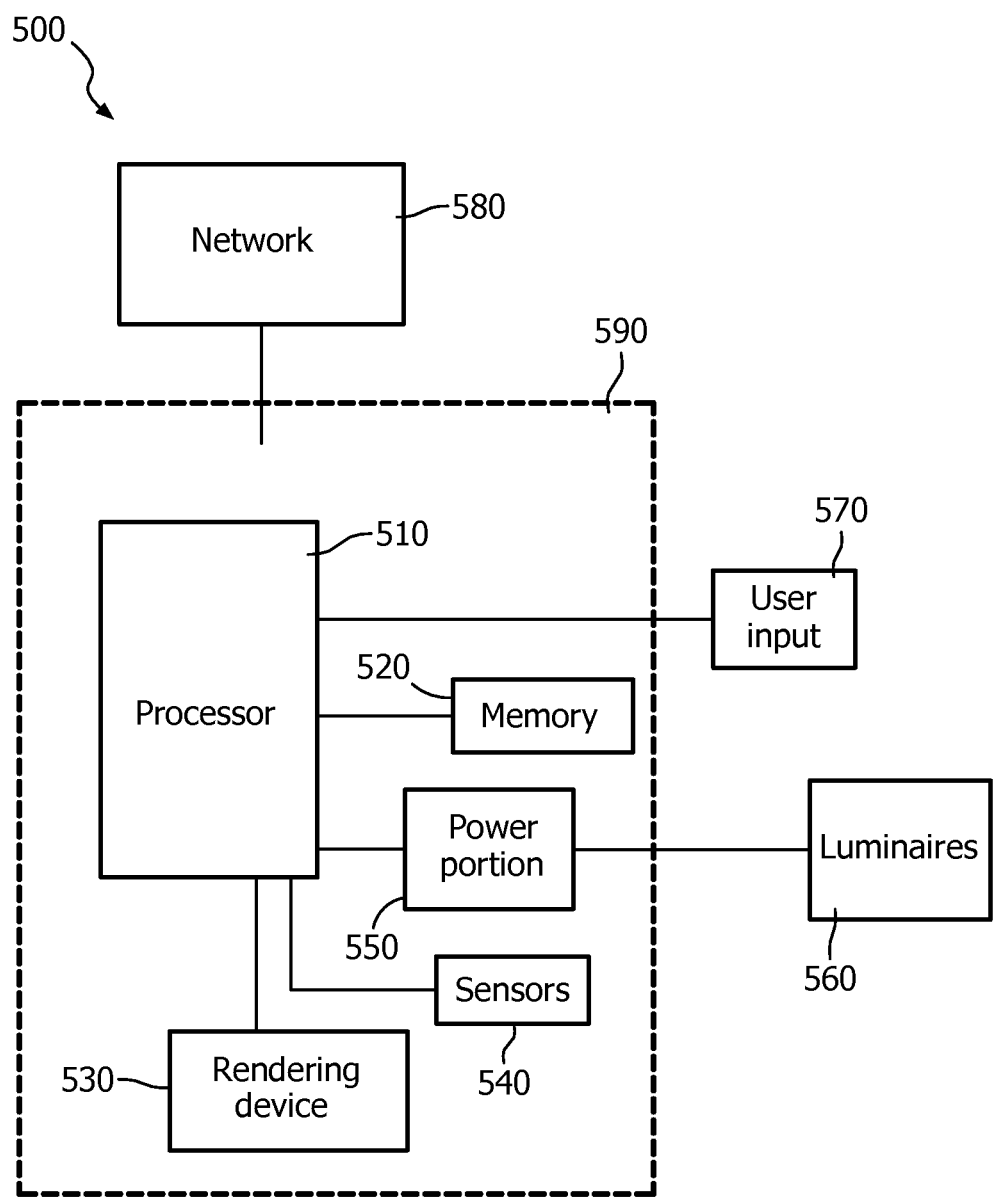
FIG. 5 shows a portion of a system in accordance with embodiments of the present system.

FIG. 5 shows a portion of a system 500 (e.g., controller 102, controller 105, etc.) in accordance with embodiments of the present system. For example, a portion of the present system may include a processor 510 operationally coupled to a memory 520, a rendering device, such as a display 530, sensors 540, a power portion 550, luminaires 560 and a user input device 570. The memory 520 may be any type of device including non-transitory devices for storing application data as well as other data related to the described operation. The application data and other data are received by the processor 510 for configuring (e.g., programming) the processor 510 to perform operation acts in accordance with the present system. The processor 510 so configured becomes a special purpose machine particularly suited for performing in accordance with the present system (e.g., as a light controller, a power management module, etc.). The sensors 540 may obtain sensor information which may be provided to the processor 510. The power portion 550 may be controlled by the processor 510 and may supply power to the luminaires 560. The luminaires 560 may operate under the control of the processor 510.

The operation acts may include requesting/receiving weather information, receiving system configuration information and illumination requirements, and/or configuring the system based on the received information. The user input 570 may include a keyboard, mouse, trackball or other device, including touch sensitive displays, which may be stand alone or be a part of a system, such as part of a personal computer, personal digital assistant, mobile phone, set top box, television or other device for communicating with the processor 510 via any operable link. The user input device 570 may be operable for interacting with the processor 510 including enabling interaction within a UI as described herein. Clearly the processor 510, the memory 520, display 530 and/or user input device 570 may all or partly be a portion of a computer system or other device such as a client and/or server as described herein.

The methods of the present system are particularly suited to be carried out by a computer software program, such program containing modules corresponding to one or more of the individual elements, steps or acts described and/or envisioned by the present system. Such program may of course be embodied in a computer-readable medium, such as an integrated chip, a peripheral device or memory, such as the memory 520 or other memory coupled to the processor 510.

The program and/or program portions contained in the memory 520 configure the processor 510 to implement the methods, operational acts, and functions disclosed herein. The memories may be distributed, for example between the individual luminaires and/or network, servers, etc., or local, and the processor 510, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 510. With this definition, information accessible through a network is still within the memory, for instance, because the processor 510 may retrieve the information from the network for operation in accordance with the present system.

The processor 510 is operable for providing control signals and/or performing operations in response to input signals from the user input device 570 as well as in response to other devices of a network and executing instructions stored in the memory 520. The processor 510 may be an application-specific or general-use integrated circuit(s). Further, the processor 510 may be a dedicated processor for performing in accordance with the present system or may be a general-purpose processor wherein only one of many functions operates for performing in accordance with the present system. The processor 510 may operate utilizing a program portion, multiple program segments, or may be a hardware device utilizing a dedicated or multi-purpose integrated circuit.

Thus, a system and method to adapt outdoor lighting networks to weather forecasts is disclosed. The system may include a light controller to manage the operation of a plurality of light units which may be powered by various sources such as a main electricity grid (e.g., a municipal grid or the "grid") or "green" energy sources (e.g., solar, wind power, etc.), and/or combinations thereof. The controller may obtain updated weather forecast information and may determine lighting operation settings (e.g., strategies) for the weather forecast information. Then, the controller may upload the lighting operation settings to light units (e.g., luminaires) of the system. The light units may operate as instructed by the lighting operation settings, which include control settings, such as diming (e.g., of an illumination source to, for example, control the illumination intensity), changing colors/spectrum, and/or illumination intensity, distribution, etc. The light operation settings may further include energy management strategies to be used in case of possible power failure and may be used to determine when to start storing energy, how much energy to store in energy storage devices associated with light units according to the weather forecast information. The system may also determine operation strategies to control energy usage and/or charging settings for luminaires powered by "green" energy sources, which are either connected or not connected to the main electricity grid, according to the weather forecast information to meet lighting requirements (e.g., thresholds), reduce energy costs, and/or achieve more uniform illumination levels under various weather conditions.

In accordance with an aspect of the present system, there is disclosed a system to manage the operation of lighting units according to lighting requirements and weather forecasts in order to enhance visibility, safety, user comfort, and energy saving in inclement weather conditions and/or during power failures, etc.

The system may include a controller (e.g., the controller 102), which may be configured to obtain updated weather forecast information, determine lighting operation strategies for the forecasted weather conditions, and communicate the lighting operation strategies (e.g., lighting settings) to the light units.

The system may further include a plurality of light units (e.g., luminaires) which may be configured to communicate with the controller and/or other light units and receive lighting operation strategies and may then be configured to operate as instructed by the lighting operation strategies communicated by the controller. Further, lighting operation strategies may include control strategies (e.g., dimming, changing color/spectrum and/or illumination intensity distribution) and/or energy management strategies (e.g., when and how much energy from a main electricity grid to store in energy storage devices at, or connected to, light units.).

The controller may further determine lighting control strategies for forecasted weather conditions which may correspond with the weather forecast information, and may upload the lighting control strategies to the light units. Accordingly, the controller may obtain the weather forecast information by actively querying weather forecast services. The controller may then receive weather forecast information which may include weather alerts/updates from weather forecast services, etc.

Further, it is envisioned that the controller may collect sensor information from sensors of the system such as roadside weather sensors, etc., which may include information indicative of a local weather conditions, surface conditions, etc. The controller may then update the weather forecast information in accordance with the sensor information (e.g., using weather models, etc.) to determine updated weather forecast information which may for example, include an updated weather forecast. Accordingly, the controller may transmit the sensor information to a weather forecast service (e.g., a third party application, etc.) which may apply the sensor information to a weather forecast model and may transmit results of the modeling to the controller.

It is also envisioned that the controller may identify light units of the present system and determine their capabilities (e.g., lighting output, operating status, etc.). The controller may then determine lighting control strategies according to the weather forecast information and determined lighting capabilities for light units. It is further envisioned that the controller may upload lighting control strategies to the light units to control light output. It is further envisioned that the controller may determine and communicate the energy management strategies to prepare for a projected power usage and availability (e.g., predicted power failure event, such as a blackout). Accordingly, the controller may obtain new/updated (e.g., current) weather forecast information and use this information to determine whether the forecast includes inclement weather for a predetermined period (e.g., the evening lighting period). Accordingly, if it is determined that the forecast for the predetermined period includes inclement weather, the controller may determine the amount of energy necessary for providing illumination (and running the system) for the predetermined time period. The controller may then determine available "green" (e.g., renewable energy) available during the predetermined time period. The controller may further determine time periods and amounts of energy to obtain from the main electricity grid at times other than the blackout period. Thus, the controller may configure the system to operate on the "grid" before and/or after a blackout period and operate on stored "green" energy during the blackout period.

It is further envisioned that when a blackout is determined to occur, the controller may determine an energy management strategy and communicate this energy management strategy to the light units. Accordingly, the controller may obtain new/updated weather forecast information and/or may obtain updates (e.g., of service availability and/or service predictions) from maintenance companies which are fixing the power failure problem. The controller may then update information related to the duration of the power failure event (e.g., 5 hrs. expected). The controller may further determine energy available to the system from other energy sources such as alternative sources which may include "green" sources, energy storage devices, etc. The controller may then determine energy and/or lighting control strategies for the forecasted weather in light of the available energy for a given period of time and may accordingly adjust the light output.

It is further envisioned that the controller may determine an energy management strategy for light units powered by renewable energy sources according to forecasted weather conditions, etc., and communicate the energy management strategy to the light units of the system. Accordingly, the controller may obtain or determine a new/updated (e.g., current) weather forecast information. The controller may then generate one or more lighting control strategies in accordance with the forecasted weather conditions as included in the weather forecast information. For example, the controller may determine available "green" energy for a time period of the forecast and thereby, control the light units accordingly. Moreover, it is envisioned that the controller may determine the amount of energy required by the light units and determine one or more lighting control strategies. The lighting system may then be configured in accordance with the one or more lighting control strategies. Accordingly, the light units may control their corresponding illumination sources such that they output illumination in accordance with one or more lighting control strategies.

It is further envisioned that the controller may determine and communicate the energy management strategies for light units powered by both main electricity grid and renewable energy sources according to forecasted weather. Accordingly, the controller may obtain a new/updated weather forecast; determine available renewable energy for the current day and/or incoming time period; determine the amount of energy required by the light units and lighting control strategies; determine time periods and the amount of energy to get from a main electricity grid; and/or communicate the energy management strategies to the light units.

Accordingly, the present system provides lighting fixture which may provide enhanced lighting characteristics while conserving resources such as energy. Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A lighting system comprising at least one controller and a memory containing program portions which configure the controller to:
   obtain weather forecast information comprising current and expected weather conditions over a period of time;
   determine one or more lighting settings based upon the weather forecast information;
   form lighting setting information in accordance with the determined lighting settings; and
   transmit the lighting setting information.

2. The lighting system of claim 1, further comprising luminaires each having:
   a transmitter receiver (Tx/Rx) which receives the lighting setting information;
   at least one illumination source to provide illumination; and
   a control portion to control the illumination source to provide illumination in accordance with the lighting setting information.

3. The system of claim 1, wherein the controller determines one or more power settings based upon the weather forecast information and forms corresponding power setting information.

4. The system of claim 3, further comprising a power portion comprising circuitry configured to selectively couple the luminaires to a selected power source of a plurality of power sources in accordance with the power setting information.

5. The system of claim 1, wherein the controller selects a power source of a plurality of power sources in accordance with weather forecast information.

6. The system of claim 1, wherein the controller determines the weather forecast information in accordance with one or more of sensor information and weather information, wherein the weather information is obtained from a weather resource.

7. The system of claim 1, wherein the lighting setting information comprises information related to one or more of illumination pattern, illumination intensity, illumination spectrum, illumination polarization, illumination frequency, and energy usage of luminaires of the system.

8. A computerized method of controlling a lighting system using a controller, the method comprising acts of:
   obtaining weather forecast information comprising one or more of current and expected weather conditions;
   determining one or more lighting settings based upon the weather forecast information;
   forming lighting setting information in accordance with the determined lighting settings; and
   transmitting the lighting setting information.

9. The method of claim 8, further comprising acts of:
   receiving the lighting setting information; and
   controlling an illumination source to provide illumination in accordance with the lighting setting information.

10. The method of claim 8, further comprising acts of
    determining one or more power settings based upon the weather forecast information; and
    forming corresponding power setting information.

11. The method of claim 10, further comprising an act of coupling luminaires to a selected power source of a plurality of power sources in accordance with the power setting information.

12. The method of claim 8, further comprising an act of selecting a power source of a plurality of power sources in accordance with weather forecast information.

13. The method of claim 8, further comprising an act of determining the weather forecast information in accordance with one or more of sensor information and weather information, wherein the weather information is obtained from a weather resource.

14. The method of claim 8, further comprising forming the lighting setting information to include information related to one or more of illumination pattern, illumination intensity, illumination spectrum, illumination polarization, frequency, and energy usage of luminaires of the system.

15. A computer program stored on a computer readable non-transitory memory medium, the computer program configured to provide a user interface (UI) to accomplish a task, the computer program comprising a program portion configured to:
    obtain weather forecast information comprising one or more of current and expected weather conditions;
    determine one or more lighting settings based upon the weather forecast information;
    form lighting setting information in accordance with the determined lighting settings; and
    transmit the lighting setting information.

16. The computer program of claim 15, wherein the program portion is further configured to:
    receive the lighting setting information; and
    control an illumination source to provide illumination in accordance with the lighting setting information.

17. The computer program of claim 15, wherein the program portion is further configured to:
    determine one or more power settings based upon the weather forecast information; and
    form corresponding power setting information.

18. The computer program of claim 17, wherein the program portion is further configured to couple luminaires to a selected power source of a plurality of power sources in accordance with the power setting information.

19. The computer program of claim 15, wherein the program portion is further configured to select a power source of a plurality of power sources in accordance with weather forecast information.

20. The computer program of claim 15, wherein the program portion is further configured to determine the weather forecast information in accordance with one or more of sensor information and weather information, wherein the weather information is obtained from a weather resource.

21. A lighting system comprising at least one controller which:
    obtains weather forecast information comprising one or more of current and expected weather conditions;
    determines one or more lighting settings based upon the weather forecast information;
    forms lighting setting information in accordance with the determined lighting settings; and
    controls an illumination characteristic of at least one illumination source of a luminaire of the system in accordance with the lighting setting information.

22. The system of claim 21, wherein the illumination characteristic comprises or more of illumination pattern, illumination intensity, illumination spectrum, illumination polarization, and energy usage of the at least one illumination source of the luminaire of the system.

* * * * *